(12) United States Patent
Williams et al.

(10) Patent No.: US 9,969,855 B2
(45) Date of Patent: May 15, 2018

(54) COMPOSITIONS COMPRISING PROPYLENE-BASED ELASTOMERS, FOAMED LAYERS MADE THEREFROM, AND METHODS OF MAKING THE SAME

(71) Applicant: ExxonMobil Chemical Patents Inc., Baytown, TX (US)

(72) Inventors: M. Glenn Williams, Houston, TX (US); Juliet B. Wagner, Houston, TX (US); Rachel L. Falta, Houston, TX (US); C. Brent Johnson, Houston, TX (US); Achiel J. M. Van Loon, Antwerp (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 100 days.

(21) Appl. No.: 15/120,290

(22) PCT Filed: Jan. 23, 2015

(86) PCT No.: PCT/US2015/012662
§ 371 (c)(1),
(2) Date: Aug. 19, 2016

(87) PCT Pub. No.: WO2015/156890
PCT Pub. Date: Oct. 15, 2015

(65) Prior Publication Data
US 2017/0066894 A1  Mar. 9, 2017

Related U.S. Application Data

(60) Provisional application No. 61/977,274, filed on Apr. 9, 2014.

(51) Int. Cl.
*C08J 9/08* (2006.01)
*C08J 9/06* (2006.01)
(Continued)

(52) U.S. Cl.
CPC . *C08J 9/08* (2013.01); *C08J 9/06* (2013.01); *C08L 23/14* (2013.01); *C08L 23/16* (2013.01);
(Continued)

(58) Field of Classification Search
CPC .......... C08J 2323/16; C08F 2500/09–2500/10
See application file for complete search history.

(56) References Cited

U.S. PATENT DOCUMENTS 5,504,172 A  4/1996  Imuta et al.
6,881,800 B2  4/2005  Friedersdorf
(Continued)

FOREIGN PATENT DOCUMENTS

WO  00/01745  1/2000
WO  00/14150  3/2000
(Continued)

OTHER PUBLICATIONS

Noordermeer, J. W. M. 2002. Ethylene-Propylene Elastomers. Encyclopedia of Polymer Science and Technology. (Year: 2002).*
(Continued)

*Primary Examiner* — Michael M Dollinger
*Assistant Examiner* — Christina H Wales (57) ABSTRACT

The present disclosure relates to compositions comprising a propylene-based elastomer, a branched polymer, and a blowing agent. The present disclosure also relates to foamed layers and articles made from such layers.

24 Claims, 3 Drawing Sheets

(51) Int. Cl.
*C08L 23/14* (2006.01)
*C08L 23/16* (2006.01)

(52) U.S. Cl.
CPC ........ *C08J 2201/03* (2013.01); *C08J 2203/02* (2013.01); *C08J 2205/00* (2013.01); *C08J 2323/14* (2013.01); *C08J 2423/06* (2013.01); *C08L 2203/14* (2013.01); *C08L 2207/066* (2013.01)

(56) References Cited

U.S. PATENT DOCUMENTS

| | | |
|---|---|---|
| 6,992,158 B2 | 1/2006 | Datta et al. |
| 7,232,871 B2 | 6/2007 | Datta et al. |
| 2002/0151611 A1 | 10/2002 | Thoen et al. |
| 2007/0083007 A1 | 4/2007 | Jacob |
| 2008/0058437 A1* | 3/2008 | Burgun ............... C08J 9/0061 521/140 |
| 2009/0105418 A1 | 4/2009 | Dharmarajan et al. |
| 2009/0247656 A1 | 10/2009 | Jacob et al. |
| 2011/0184127 A1 | 7/2011 | Williams |
| 2011/0263734 A1 | 10/2011 | Lapierre |
| 2013/0102732 A1 | 4/2013 | Dharmarajan et al. |
| 2017/0247522 A1* | 8/2017 | Kalfus ............... C08J 9/103 |

FOREIGN PATENT DOCUMENTS

| | | |
|---|---|---|
| WO | 02/036651 | 5/2002 |
| WO | 2006/047060 | 5/2006 |

OTHER PUBLICATIONS

Andy H. Tsou, Alexander I. Norman, Yonglai Lu, Joseph A. Throckmorton, Benjamin S. Hsiao. Sequence distribution and elastic properties of propylene-based elastomers. Polymer 111 (2017) 115-122. (Year: 2017).*

Cheng, "$^{13}C$ NMR Analysis of Ethylene-Propylene Rubbers", Macaromolecules, vol. 17, pp. 1950-1955 (1984).

Sun et al., *Effect of Short Chain Branching on the Coil Dimensions of Polyolefins in Dilute Solution:*, Macromolecules 2001, vol. 34, pp. 6812-6820.

Tsutsui et al., "Propylene homo- and copolymerization with ethylene using an ehtylenebis(1-indenyl)zirconium dichloride and methylaluminoxane catalyst system", Polymer, vol. 30, pp. 1350-1356 (1989).

* cited by examiner

COMPOSITIONS COMPRISING PROPYLENE-BASED ELASTOMERS, FOAMED LAYERS MADE THEREFROM, AND METHODS OF MAKING THE SAME

CROSS REFERENCE TO RELATED APPLICATIONS

This present application is a National Stage Application of International Application No. PCT/US2015/012662, filed Jan. 23, 2015, which claims the benefit of and priority to Ser. No. 61/977,274, filed Apr. 9, 2014, the disclosure of which is incorporated by reference in its entirety.

FIELD OF THE INVENTION

This disclosure relates to compositions comprising a propylene-based elastomer, a branched polymer and a blowing agent, and also relates to foamed layers made from such compositions and method of making them.

BACKGROUND OF THE INVENTION

Materials with good stretchability and elasticity are used in a variety of applications for disposable and durable articles, such as in personal hygiene applications, roofing or flooring applications, packaging applications, etc. In hygiene applications including, incontinence pads, disposable diapers, training pants, clothing, undergarments, and sports apparel, comfort is a primary design consideration for a layer closely contacting with the body of the wearer.

Propylene-based elastomers, such as those commercially available under the trade name of Vistamaxx™ (ExxonMobil Chemical Company, Houston, Tex., USA) and VERSIFY™ (The Dow Chemical Company, Midland, Mich., USA) provide good stretchability and elasticity and therefore their use in the aforementioned applications has been considered. A foamed layer containing such propylene-based elastomers becomes more desirable because they further provide reduced tackiness and a light-weighing property in addition to stretchability and elasticity, which provides better comfort, for example, in hygiene applications, and reduces the cost of the raw material.

U.S. Patent Application Publication Nos. 2009/0105418 and 2013/102732 disclose a film composition comprising one or more propylene-based polymers and one or more hydrocarbon resins, and methods for making the same are provided. The propylene-based polymer may have (i) 60 wt % or more units derived from propylene; (ii) isotactically arranged propylene derived sequences; and (iii) a heat of fusion less than 65 J/g. The hydrocarbon resin may have a glass transition temperature greater than 20° C.

U.S. Patent Application Publication No. 2011/184127 discloses a film comprising one or more propylene-based polymers, one or more hydrocarbon resins, and one or more polyolefin additives provide enhanced mechanical and elastic properties compared to the neat propylene-based polymer. The propylene-based polymer may have (i) 60 wt % or more units derived from propylene; and (ii) crystallinity of from 0.25% to 40%, resulting from isotactically arranged propylene-derived sequences. The hydrocarbon resin may have a glass transition temperature greater than 20° C.

U.S. Patent Application Publication No. 2002/0151611 discloses a foam comprising a propylene-based copolymer material comprising at least 50 wt % of units derived from propylene, based upon the total propylene copolymer material, and units derived from ethylenically unsaturated comonomers and having a melt strength of at least 5 cN, and a melt drawability of at least 20 mm/s, process for making a foam using such a propylene copolymer material, process for making a foam in the form of thermoplastic foam bead using such a propylene copolymer material, and an expandable composition comprising such a propylene copolymer material.

U.S. Patent Application Publication No. 2009/0247656 discloses a closed cell foam material containing a propylene-based polymer comprising from 5% to 32% by weight alpha-olefin units. The propylene-based polymer has a heat of fusion, as determined by DSC, of less than 80 J/g. The material also contains 0.5 to 5 phr peroxide, 1.0 to 5.0 phr blowing agent, and 0.1 to 10 phr co-agent. The cells of closed cell foam material have a diameter in the range of 0.1 to 1.5 mm.

In particular, when making a foamed film or layer for the aforementioned applications, a cast film or layer may be preferable in terms of its good formability.

However, during a cast film processing, it is found the foamed material cannot be effectively drawn down to a desired thickness while maintaining the cell structures in good conditions in the foamed film or layer. It is believed that is because the melt strength of the propylene-based elastomer is low.

Therefore, there is a need to provide compositions and articles made therefrom that can provide a combination of stretchability, elasticity, softness, light-weighing properties, while maintaining good processability. There is also a need to methods of making such compositions and articles.

SUMMARY OF THE INVENTION

In one aspect, embodiments described herein provide a composition comprising: a propylene-based elastomer comprising propylene and from 3% to 35% by weight ethylene and/or $C_4$ to $C_{20}$ alpha-olefin derived units based upon the weight of the propylene-based elastomer, the elastomer having a heat of fusion, as determined by DSC, of less than 75 J/g, a melting point, as determined by DSC, of less than 110° C., a branched polymer having a branching index of less than 0.95, and a blowing agent.

In another aspect, embodiments described herein provide a foamed layer made from the above compositions. The foamed layer comprises a propylene-based elastomer comprising propylene and from 3% to 35% by weight ethylene and/or $C_4$ to $C_{20}$ alpha-olefin derived units based upon the weight of the propylene-based elastomer, the elastomer having a heat of fusion ("Hf"), as determined by DSC, of less than 75 J/g, and a melting point, as determined by DSC, of less than 110° C.; a branched polymer having a branching index of less than 0.95. In a class of embodiments of the invention, a plurality of cell voids are encapsulated within the foamed layer. In some embodiments, the foamed layer has a density of from 0.30 g/cm$^3$ to 0.80 g/cm$^3$, and in some embodiments the foamed layer has a density at least 10% lower than a comparative layer samples as described below.

In a further aspect, embodiments described herein provide a method of making a foamed layer comprising the steps of: (a) providing a propylene-based elastomer comprising propylene and from 3% to 35% by weight ethylene and/or $C_4$ to $C_{20}$ alpha-olefin derived units based upon the weight of the propylene-based elastomer, the elastomer having a heat of fusion, as determined by DSC, of less than 75 J/g, and a melting point, as determined by DSC, of less than 110° C.; and a branched polymer having a branching index of less than 0.95; (b) forming a melt blend of the propylene-based elastomer, the branched polymer, and a blowing agent; and (c) extruding the melt blend to form the foamed layer.

In yet another aspect, the disclosure provides articles comprising the composition or the foamed layer made from the composition. Articles can be a film, a roofing material, tape material, a flooring material, a packaging material, or a personal hygiene material.

DETAILED DESCRIPTION OF EMBODIMENTS OF THE INVENTION

Embodiments of the invention provide compositions comprising a propylene-based elastomer, a branched polymer, and a blowing agent, and in particular foamed layers made therefrom. The foamed layer has improved properties such as reduced density and light-weighing, compared with a comparative layer sample, without compromising elasticity and stretchability. The compositions and foamed layers made therefrom are desirable for applications in films including monolayer or multi-layer films, roofing material, tape material, flooring material, packaging material, and personal hygiene material.

In this description, all numbers disclosed herein are approximate values, regardless whether the word "about" is used in connection therewith.

Unless stated otherwise, all weight percentages of components in a composition are based upon the total weight of the composition.

An "olefin" described herein alternatively referred to as "alkene" is a linear, branched, or cyclic compound of carbon and hydrogen having at least one double bond. For purposes of this specification and the claims appended thereto, when a polymer or copolymer is referred to as comprising an olefin, including, but not limited to, ethylene, hexene, and diene, the olefin present in such polymer or copolymer is the polymerized form of the olefin. For example, when a copolymer is said to have an "ethylene" content of 35 wt % to 55 wt %, it is understood that the comonomer unit in the copolymer is derived from ethylene in the polymerization reaction and said derived units are present at 35 wt % to 55 wt %, based upon the weight of the copolymer.

A "polymer" described herein has the same or two or more of different comonomer units. A "homopolymer" is a polymer having comonomer units that are the same. A "copolymer" is a polymer having two or more comonomer units that are different from each other. The term "different" as used to refer to comonomer units indicates that the comonomer units differ from each other by at least one atom or are different isomerically. Accordingly, the definition of copolymer, as used herein, includes terpolymers and the like. Likewise, the definition of polymer, as used herein, includes copolymers and the like. Thus, as used herein, the terms "polyethylene" or "ethylene polymer" means a polymer or copolymer comprising at least 50 mol % ethylene units (preferably at least 70 mol % ethylene units, more preferably at least 80 mol % ethylene units, even more preferably at least 90 mol % ethylene units, even more preferably at least 95 mol % ethylene units or 100 mol % ethylene units (in the case of a homopolymer)). Likewise, the term "polypropylene" as used herein means a polymer or copolymer comprising at least 50 mol % propylene units (preferably at least 70 mol % propylene units, more preferably at least 80 mol % propylene units, even more preferably at least 90 mol % propylene units, even more preferably at least 95 mol % propylene units or 100 mol % propylene units (in the case of a homopolymer)), but "polypropylene" shall not include a propylene-based elastomer described herein unless otherwise defined.

A "comparative layer sample" described herein is a layer made from a polyolefin composition that includes a blowing agent but is free of the branched polymer and is otherwise identical in terms of the constituents.

Propylene-Based Elastomer

The composition of the present disclosure comprises a propylene-based elastomer comprising propylene and from 3% to 35% by weight ethylene and/or $C_4$ to $C_{20}$ alpha-olefin derived units based upon total weight of the propylene-based elastomer, the elastomer having a heat of fusion, as determined by DSC, of less than 75 J/g, and a melting point, as determined by DSC, of less than 110° C.

The alpha-olefin comonomer may be linear or branched, and two or more comonomers may be used, if desired. In some embodiments, the alpha-olefin comonomers can be ethylene and/or $C_4$ to $C_{10}$ alpha-olefins. Examples of suitable alpha-olefin comonomers include butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene.

The propylene-based elastomers may have a comonomer content (i.e., ethylene and/or $C_4$ to $C_{20}$ alpha-olefin content) in the range of from 3 wt % to 35 wt %, based upon the weight of the propylene-based elastomer. In general, the comonomer content is adjusted so that the propylene-based elastomer has an Hf of less than or equal to 75 J/g and a melt flow rate ("MFR", ASTM D1238, 2.16 kg, 230° C.) in the range of 0.5 g/10 min to 50 g/10 min. In some embodiments, the propylene-based elastomer has an isotactic triad fraction in the range of 65% to 99%.

The propylene-based elastomer may incorporate propylene-derived units having crystalline regions interrupted by non-crystalline regions. The non-crystalline regions may result from regions of non-crystallizable polypropylene segments and/or the inclusion of comonomer units. The crystallinity and the melting point of the propylene-based elastomer may be reduced as compared to highly isotactic polypropylene by the introduction of errors in the insertion of propylene and/or by the presence of comonomer.

In some embodiments, the crystallinity of the propylene-based elastomer is reduced by the copolymerization of propylene with limited amounts of one or more comonomers selected from: ethylene, $C_4$ to $C_{20}$ alpha-olefins, and optionally dienes. Preferred comonomers are ethylene, 1-butene, 1-hexane, and/or 1-octene. The propylene-based elastomer may comprise comonomer-derived units in an amount in the range of 3 wt % to 35 wt %, or in the range of 5 wt % to 28 wt %, or in the range of 5 wt % to 25 wt %, or in the range of 5 wt % to 20 wt %, or in the range of 5 wt % to 16 wt %, or in the range of 6 wt % to 18 wt %, or in some embodiments in the range of 7 wt % to 20 wt % comonomer-derived units, based upon the weight of the propylene-based elastomer. The comonomer content of the propylene-based elastomer may be determined by $^{13}C$ NMR.

In one embodiment, the propylene-based elastomer comprises at least 65 wt %, or at least 75 wt %, or at least 80 wt %, or at least 82 wt %, or at least 84 wt % or at least 89 wt %, of propylene-derived units, based upon the weight of the propylene-based elastomer. In another embodiment, the propylene-based elastomer comprises from 65 wt % to 97 wt %, or from 75 wt % to 95 wt %, or from 89 wt % to 93 wt %, or from 80 wt % to 90 wt %, of propylene-derived units, based upon the weight of the propylene-based elastomer.

In some embodiments, when more than one comonomer is present, the amount of a particular comonomer may be less than 3 wt %, but the combined comonomer content is preferably greater than 3 wt %. When there is more than one comonomer unit in the copolymer, the total weight percent of the ethylene and/or $C_4$ to $C_{20}$ alpha-olefin derived units may be in the range of 5 wt % to 35 wt %, or in the range of 7 wt % to 32 wt %, or in the range of 8 wt % to 25 wt %, or preferably in the range of 8 wt % to 20 wt %, or more preferably in the range of 8 wt % to 18 wt %. Particular embodiments of copolymers having more than one comonomer units include propylene-ethylene-octene, propylene-ethylene-hexene, and propylene-ethylene-butene polymers. These copolymers may further comprise a diene.

In some embodiments, the propylene-based elastomer consists essentially of units derived from propylene and ethylene. The propylene-based elastomer may comprise 5 wt % to 35 wt % of ethylene-derived units, or 5 wt % to 30 wt %, or 5 wt % to 25 wt %, or 5 wt % to 20 wt % of ethylene-derived units, based upon the total weight of the propylene-based elastomer. In one embodiment, the propylene-based elastomer comprises 10 wt % to 12 wt % of ethylene-derived units, based upon the total weight of the propylene-based elastomer. In another embodiment, the propylene-based elastomer comprises 15 wt % to 20 wt % of ethylene-derived units, based upon the total weight of the propylene-based elastomer. In other embodiments, the propylene-based elastomer may comprise 5 wt % to 16 wt % of ethylene-derived units.

In some embodiments, the propylene-based elastomers may further comprise one or more diene-derived units. The propylene-based elastomer may comprise less than or equal to 12 wt % diene-derived units (or "diene"), or less than or equal to 10 wt % diene, or less than or equal to 5 wt % diene, or preferably less than or equal to 3 wt % diene. In some embodiments, the diene is present in the range of 0.1 wt % to 9 wt %, or in the range of 0.1 wt % to 6 wt %, or in the range of 0.1 wt % to 5 wt %, or in the range of 0.1 wt % to 4 wt %, or in the range of 0.1 wt % to 2 wt %, or in the range of 0.1 wt % to 1 wt %. In other embodiments, the propylene-based elastomer may comprise the diene in an amount in the range of from 2.0 wt % to 7.0 wt %, or in the range of 3.0 wt % to 5.0 wt %, based upon the total weight of the propylene-based elastomer. The optional diene units may be derived from any hydrocarbon structure having at least two unsaturated bonds wherein at least one of the unsaturated bonds may be incorporated into a polymer. Suitable dienes include, but are not limited to: straight chain acyclic olefins such as 1,4-hexadiene and 1,6-octadiene; branched chain acyclic olefins such as 5-methyl-1,4-hexadiene, 3,7-dimethyl-1,6-octadiene, and 3,7-dimethyl-1,7-octadiene; single ring alicyclic olefins, such as 1,4-cyclohexadiene, 1,5-cyclooctadiene, and 1,7-cyclododecadiene; multi-ring alicyclic fused and bridged ring olefins such as tetrahydroindene, methyl-tetrahydroindene, dicyclopentadiene ("DCPD"), ethylidene norbornene ("ENB"), norbornadiene, alkenyl norbornenes, alkylidene norbornenes, cycloalkelnyl norobornenes, and cycloalkylinene norbornenes (such as 5-vinyl-2-norbornene); cycloalkenyl-substituted alkenes, such as vinyl cyclohexene, allyl cyclohexene, vinyl cyclooctene, 4-vinyl cyclohexene, alkyl cyclodecene, vinyl cyclododecene, divinyl benzene, and tetracyclo (A-11,12)-5,8-dodecene; and combinations thereof. In certain embodiments, the diene is 5-ethylidene-2-norbornene, 5-vinyl-2-norbornene, or divinyl benzene. The diene, if present, is preferably ENB.

The propylene-based elastomer may have a melt flow rate ("MFR", ASTM D1238, 2.16 kg, 230° C.), greater than or equal to 0.2 g/10 min, or greater than or equal to 0.5 g/10 min. In some embodiments, the propylene-based elastomer may have a MFR in the range of 0.5 g/10 min to 50 g/10 min, or in the range of 1 g/10 min to 40 g/10 min, or in the range of 2 g/10 min to 35 g/10 min, or in the range of 2 g/10 min to 30 g/10 min. In other embodiments, the propylene-based elastomer's MFR is in the range of 0.5 to 50 g/10 min, or in the range of 2 g/10 min to 10 g/10 min, or in the range of 2 g/10 min to 8 g/10 min, or in the range of 3 g/10 min to 5 g/10 min.

In one embodiment, the propylene-based elastomer has a heat of fusion ("Hf"), as determined by the Differential Scanning Calorimetry ("DSC") procedure described herein, of greater than or equal to 0.5 J/g, or 1 J/g, or 5 J/g, and is less than or equal to 75 J/g, or preferably less than or equal to 70 J/g, or 50 J/g, or less than or equal to 35 J/g. Stated another way, in one or more embodiments, the Hf value may be within any range from a low value of 1.0 J/g, or 1.5 J/g, or 3.0 J/g, or 4.0 J/g, or 6.0 J/g, or 7.0 J/g to a high value of 30 J/g, or 35 J/g, or 40 J/g, or 50 J/g, or 60 J/g, or 70 J/g, or 75 J/g.

The propylene-based elastomer may have a percent crystallinity within the range of 0.5% to 40%, or in the range of 1% to 30%, or preferably in the range of 5% to 35%, wherein "percent crystallinity" is determined according to the DSC procedure described herein. The thermal energy for the highest order of propylene is estimated at 189 J/g (i.e., 100% crystallinity is equal to 189 J/g). In some embodiments, the propylene-based elastomer has a crystallinity less than 40%, or in the range of 0.25% to 25%, or in the range of 0.5% to 22%.

The procedure for DSC determinations is as follows. 0.5 grams of polymer is weighed and pressed to a thickness of 15 to 20 mils (about 381-508 microns) at 140° C.-150° C., using a "DSC mold" and MYLAR™ film as a backing sheet. The pressed polymer sample is allowed to cool to ambient temperatures by hanging in air (the MYLAR™ film backing sheet is not removed). The pressed polymer sample is then annealed at room temperature (about 23° C.-25° C.). A 15-20 mg disc is removed from the pressed polymer sample using a punch die and is placed in a 10 microliter aluminum sample pan. The disc sample is then placed in a DSC (Perkin Elmer Pyris 1 Thermal Analysis System) and is cooled to −100° C. The sample is heated at 10° C./min to attain a final temperature of 165° C. The thermal output, recorded as the area under the melting peak of the disc sample, is a measure of the heat of fusion and can be expressed in Joules per gram (J/g) of polymer and is automatically calculated by the Perkin Elmer system. Under these conditions, the melting profile shows two (2) maxims, the maxima at the highest temperature is taken as the melting point within the range of melting of the disc sample relative to a baseline measurement for the increasing heat capacity of the polymer as a function of temperature.

The propylene-based elastomer may have a single peak melting transition as determined by DSC. In one embodiment, the propylene-based elastomer has a primary peak transition of less than 90° C., with a broad end-of-melt transition of greater than 110° C. The peak "melting point" ("Tm") is defined as the temperature of the greatest heat absorption within the range of melting of the sample. However, the copolymer may show secondary melting peaks adjacent to the principal peak, and/or at the end-of-melt transition, however for the purposes herein, such secondary melting peaks are considered together as a single melting point, with the highest of these peaks being considered the Tm of the propylene-based elastomer. The propylene-based elastomer may have a Tm of less than or equal to 110° C., or less than or equal to 100° C., or less than or equal to 90° C., or less than or equal to 80° C., or less than or equal to 70° C., or in one embodiment, in the range of 25° C. to 100° C., or in the range of 25° C. to 85° C., or in the range of 25° C. to 75° C., or in the range of 25° C. to 65° C., or in the range of 30° C. to 80° C., or in the range of 30° C. to 70° C.

The propylene-based elastomer may have a weight average molecular weight ("Mw") in the range of 5,000 g/mole to 5,000,000 g/mole, or preferably in the range of 10,000 g/mole to 1,000,000 g/mole, or more preferably in the range of 50,000 g/mole to 400,000 g/mole. In some embodiments, the propylene-based elastomer has a Mw greater than 10,000 g/mole, or greater than 15,000 g/mole, or greater than 20,000 g/mole, or greater than 80,000 g/mole and less than 5,000,000 g/mole, or less than 1,000,000 g/mole, or less than 500,000 g/mole.

The propylene-based elastomer may have a number average molecular weight ("Mn") in the range of 2,500 g/mole to 2,500,00 g/mole, or preferably in the range of 10,000 g/mole to 250,000 g/mole, or more preferably in the range of 25,000 g/mole to 200,000 g/mole. The propylene-based elastomer may have a Mz within the range of 10,000 g/mole to 7,000,000 g/mole, or preferably in the range of 80,000 g/mole to 700,000 g/mole, or more preferably in the range of 100,000 g/mole to 500,000 g/mole.

The propylene-based elastomer may have a molecular weight distribution ("MWD") (Mw/Mn) within the range of 1.5 to 20, or in the range of 1.5 to 15, or in the range of 1.5 to 5, or preferably in the range of 1.8 to 5, or more preferably in the range of 1.8 to 3 or 4. In some embodiments, the propylene-based elastomer can have a MWD in the range of 1.5 or 1.8 or 2.0 to 4.5 or 5 or 10 or 20.

Techniques for determining the molecular weight (Mn, Mw, and Mz) and MWD of propylene-based elastomers are as follows, and as in Verstate et al., in 21 MACROMOLECULES 3360 (1988). Conditions described herein govern over published test conditions. Molecular weight and MWD are measured using a Waters 150 gel permeation chromatograph equipped with a Chromatix KMX-6 on-line light scattering photometer. The system is used at 135° C. with 1,2,4-trichlorobenze as the mobile phase. Showdex (Showa-Denko America, Inc.) polystyrene gel columns 802, 803, 804, and 805 are used. This technique is discussed in LIQUID CHROMATOGRAPHY OF POLYMERS AND RELATED MATERIALS III, 207 (J. Cazes ed., Marcel Dekker, 1981). No corrections for column spreading were employed; however, data on generally acceptable standards, e.g., National Bureau of Standards Polyethylene 1484 and anionically produced hydrogenated polyisoprenes (an alternating ethylene propylene copolymer) demonstrate that such corrections on Mw/Mn or Mz/Mw are less than 0.05 units. Mw/Mn was calculated from an elution time-molecular relationship whereas Mz/Mw was evaluated using the light scattering photometer. The numerical analysis can be performed using the commercially available computer software GPC2, MOLWT2 available from LDC/Milton Roy-Rivera Beach, Fla.

Triad tacticity can be determined as follows: The tacticity index, expressed herein as "m/r", is determined by $^{13}$C nuclear magnetic resonance ("NMR") techniques. The tacticity index m/r is calculated as defined by H. N. Cheng, "$^{13}$C NMR Analysis of Ethylene-Propylene Rubbers," in MACROMOLECULES, 17, pp. 1950-1955 (1984), incorporated by reference. The designation "m" or "r" describes the stereochemistry of pairs of contiguous propylene groups, "m" referring to meso and "r" to racemic. An m/r ratio of 1.0 generally describes a syndiotactic polymer and an m/r ratio of 2.0 an atactic material. An isotactic material theoretically may have a ratio approaching infinity, and many by-product atactic polymers have sufficient isotactic content to result in ratios of greater than 50. Embodiments of the propylene-based elastomer have a tacticity index m/r ranging from a lower limit of 4 or 6 to an upper limit of 8 or 10 or 12.

The propylene-based elastomer may have an isotactic triad tacticity of three propylene units, as measured by $^{13}$C NMR, of 75% or more, or 80% or more, or 82% or more, or 85% or more, or in some embodiments, 90% or more. Preferably the triad tacticity is in the range of 50% to 99%, or in the range of 60% to 99%, or more preferably in the range of 75 to 99%, or in the range of 80% to 99%, or in the range of 70% to 98%, or in other embodiments in the range of 60% to 97%. As used herein, isotactic triad tacticity is defined to be an mm triad tacticity of three propylene units, as measured by $^{13}$C NMR. The triad tacticity can be determined from a $^{13}$C NMR spectrum of the polymer as described below and as described in U.S. Pat. No. 5,504,172, herein incorporated by reference. The mm triad tacticity of a polymer is the relative tacticity of a sequence of three adjacent propylene units, a chain consisting of head to tail bonds, expressed as a binary combination of m and r sequences. It is usually expressed for the propylene-based elastomers as the ratio of the number of units of the specified tacticity to all of the propylene triads in the copolymer. The mm triad tacticity (mm fraction) of a propylene copolymer can be determined from a $^{13}$C NMR spectrum of the propylene copolymer and the following formula:

$$mm \text{ Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

The spectrum relating to the methyl carbon region (19-23 parts per million (ppm)) can be divided into a first region (21.2 ppm-21.9 ppm), a second region (20.3-21.0 ppm) and a third region (19.5 ppm-20.3 ppm). Each peak in the spectrum was assigned with reference to an article in the journal *Polymer*, Volume 30 (1989), page 1350. In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm). The calculation of the triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based upon the 3 propylene units-chains (PPP(mr) and PPP(rr)) consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined.

The propylene-based elastomer may have a density within the range of 0.855 g/cm$^3$ to 0.900 g/cm$^3$, or in the range of 0.860 g/cm$^3$ to 0.895 g/cm$^3$, or preferably in the range of 0.860 g/cm$^3$ to 0.890 g/cm$^3$ at room temperature as measured per the ASTM D-1505 test method.

The propylene-based elastomer may possess an Elongation at Break (ASTM D-412 at 23° C.) of less than 2000%, or less than 1000%, or less than 900%.

The propylene-based elastomer may have a melt strength of less than 5 cN, less than 4 cN, less than 3 cN, less than 2 cN, less than 1 cN, less than 0.5 cN, or less than 0.1 cN.

In one embodiment, the propylene-based elastomer has a Shore A hardness (ASTM D-2240 at 23° C.) of less than 90. In another embodiment, the propylene-based elastomer has a Shore A hardness in the range of 45 to 90, or in the range of 55 to 80.

In one embodiment, the propylene-based elastomer comprises 80 wt % to 90 wt % propylene-derived units and 10 wt % to 20 wt % of ethylene-derived units. The propylene-based elastomer may have a density in the range of 0.855 g/cm$^3$ to 0.870 g/cm$^3$ and an MFR in the range of 2 g/10 min to 4 g/10 min. The propylene-based elastomer may have a Shore A hardness in the range of 60 to 70. The propylene-based elastomer may have a percent crystallinity in the range of 3% to 10%.

In another embodiment, the propylene-based elastomer comprises 85 wt % to 95 wt % propylene-derived units and 5 wt % to 15 wt % ethylene-derived units. The propylene-based elastomer may have a density in the range of 0.865 g/cm$^3$ to 0.880 g/cm$^3$ and an MFR in the range of 2 g/10 min to 4 g/10 min. The propylene-based elastomer may have a Shore A hardness in the range of 80 to 95. The propylene-based elastomer may have a percent crystallinity in the range of 5% to 15%.

The propylene-based elastomer can be added into the composition in an amount of from 30 wt % to 99.5 wt % based upon the weight of the composition. In some embodiments, the amount of the propylene-based elastomer can be in any range of from a low value of 30 wt %, 35 wt %, 40 wt %, 45 wt %, 50 wt %, 60 wt %, 65 wt %, or 70 wt % to a high value of 99.5 wt %, 99 wt %, 95 wt %, 90 wt %, 85 wt %, 80 wt %, 75 wt %, or 70 wt %, based on the weight of the composition, so long as the high value is not less than the low value.

The propylene-based elastomers described herein are not limited by any particular polymerization method for preparing the propylene-based elastomer. The propylene-based elastomers can include copolymers prepared according to the procedures in WO 00/01745, WO 02/36651, U.S. Pat. Nos. 6,992,158, 6,881,800, and 7,232,871, all of which are herein incorporated by reference. Examples of commercially available propylene-based elastomers include resins sold under the trade names VISTAMAXX™ (ExxonMobil Chemical Company, Houston, Tex., USA) and VERSIFY™ (The Dow Chemical Company, Midland, Mich., USA).

Branched Polymer

The composition of the present disclosure comprises a branched polymer having a branching index of less than 0.95.

The branched polymer may have a branching index g' of less than 0.95. The branching index g' quantifies the degree of long chain branching in a selected branched polymer.

The branching index g' herein is g'$_{vis}$ can be tested using Gel Permeation Chromatography with Three Detectors (GPC-3D).

Mw, Mn and Mw/Mn are determined by using a High Temperature Gel Permeation Chromatography (Polymer Laboratories), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, pp. 6812-6820, (2001) and references therein. Three Polymer Laboratories PLgel 10 μm Mixed-B LS columns are used. The nominal flow rate is 0.5 mL/min, and the nominal injection volume is 300 μL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1, 2, 4 trichlorobenzene (TCB). The TCB mixture is then filtered through a 0.1 μm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are 1.463 g/ml at room temperature and 1.284 g/ml at 145° C. The injection concentration is from 0.5 to 2.0 mg/ml, with lower concentrations being used for higher molecular weight samples. Prior to running each sample the DRI detector and the viscometer are purged. Flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 145° C. and λ=690 nm. Units on parameters throughout this description of the GPC-3D method are such that concentration is expressed in g/cm³, molecular weight is expressed in g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle $\theta$, c is the polymer concentration determined from the DRI analysis, $A_2$ is the second virial coefficient. $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system, which takes the same value as the one obtained from DRI method. The refractive index, n=1.500 for TCB at 145° C. and $\lambda$=657 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the following equation:

$$\eta_s = c[\eta] + 0.3(c[\eta])^2$$

where c is concentration and was determined from the DRI output.

The branching index ($g'_{vis}$) is calculated using the output of the GPC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limit.

The branching index $g'_{vis}$ is defined as:

$$g'_{vis} = \frac{[\eta]_{avg}}{kM_v^\alpha}$$

where, $M_v$ is the viscosity-average molecular weight based on molecular weights determined by LS analysis; k and $\alpha$ are coefficients, and for purpose of this invention and claims thereto, $\alpha$ can be 0.695 for ethylene, propylene and butene polymers; and k can be 0.000579 for ethylene polymers including, but not limited to, ethylene-vinyl acetate copolymers and ethylene-methacrylate copolymers, 0.000228 for propylene polymers, and 0.000181 for butene polymers. See Macromolecules, 2001, 34, 6812-6820, *Effect of Short Chain Branching on the Coil Dimensions of Polyolefins in Dilute Solution*, T. Sun and P. Brant, for guidance on determination of k and $\alpha$ coefficients for other polymer types.

In some preferred embodiments, the branching index of the branched polymer can be from less than 0.95, or within any range from a low value of 0.05, 0.10, 0.15, 0.20, 0.25, 0.30, 0.35, 0.40, 0.45, or 0.50, to a high value of 0.95, 0.90, 0.85, 0.80, 0.75, 0.70, 0.65, 0.60, 0.55, or 0.50, so long as the high value is not less than the low value.

The branched polymer may have relatively higher melt strength than that of the propylene-based elastomer. As used herein "melt strength" refers to the force required to draw a molten polymer extrudate at a rate of 12 mm/s2 at an extrusion temperature of 190° C. until breakage of the extrudate, whereby the force is applied by take up rollers.

In some embodiments, the branched polymer may have a melt strength of at least 5 cN, or, at least 10 cN, at least 15 cN, at least 20 cN, or at least 30 cN. In some embodiments, the melt strength of branched polymer is at least 5% higher than that of the propylene-based elastomer, preferably at least 10%, preferably at least 20%, preferably at least 30%, preferably at least 40%, preferably at least 50%, preferably at least 60%, preferably at least 100%, preferably at least 200%, preferably at least 300%, preferably at least 400%, preferably at least 500%, preferably at least 600%, preferably at least 700%, preferably at least 800%.

The branched polymer may have a melt index, as determined by ASTM D1238 (190° C., 2.16 kg), of from 0.2 g/10 min to 20 g/10 min, or within a range from a low value of 0.2 g/10 min, 0.5 g/10 min, 1 g/10 min, 2 g/10 min, 2.5 g/10 min, 3 g/10 min, 5 g/10 min to a high value of 20 g/10 min, 15 g/10 min, 12 g/10 min, 10 g/10 min, or 8 g/10 min, so long as the low value is not less than the high value.

The branched polymer may have a density of greater than 0.900 g/cm³, or within a range of from a low value of 0.900 g/cm³, 0.905 g/cm³, 0.910 g/cm³, 0.915 g/cm³, 0.920 g/cm³, 0.925 g/cm³ to a high value of 0.950 g/cm³, 0.945 g/cm³, 0.930 g/cm³, 0.925 g/cm³, or 0.920 g/cm³, so long as the high value is not less than the low value.

The branched polymer may have molecular weight distribution (MWD, Mw/Mn) of greater than 1.5, or greater than 3, or greater than 5, or greater than 10, or greater than 15, or greater than 20.

The branched polymer may be added in an amount of from 0.2 wt % to 70 wt % based upon the total weight of the composition. In some embodiments, the branched polymer is present in any range from a low value of 0.2 wt %, 0.5 wt %, 1 wt %, 1.5 wt %, 2 wt %, 2.5 wt %, 3 wt %, 5 wt %, 7 wt %, or 10 wt %, to a high value of from 70 wt %, 60 wt %, 45 wt %, 30 wt %, 25 wt %, 15 wt %, 10 wt %, 8 wt %, 6 wt %, or 5 wt %, based upon the weight the composition, so long as the high value is not less than the low value.

Suitable branched polymers are those derived from one or more olefins. An olefin (i.e., alkene) is a hydrocarbon that contains at least one carbon-carbon double bond. Some non-limiting examples of olefins include linear or branched, cyclic or acyclic, alkenes having from 2 to 20 carbon atoms. In some embodiments, the alkene has between 2 and 10 carbon atoms. In other embodiments, the alkene contains at least two carbon-carbon double bonds, such as butadiene and 1,5-hexadiene. In further embodiments, at least one of the hydrogen atoms of the alkene is substituted with an alkyl or aryl. In particular embodiments, the alkene is ethylene, propylene, 1-butene, 1-hexene, 1-octene, 1-decene, 4-methyl-1-pentene, norbornene, 1-decene, butadiene, 1,5-hexadiene, styrene or a combination thereof.

Non-limiting examples of polymers include polyethylenes; polypropylenes; polybutylenes (e.g., polybutene-1); polypentene-1; polyhexene-1; polyoctene-1; polydecene-1; poly-3-methylbutene-1; poly-4-methylpentene-1; polyisoprene; polybutadiene; poly-1,5-hexadiene; copolymers derived from olefins; copolymers derived from olefins and other polymers such as polyvinyl chloride, polystyrene, polyurethane, and the likes; and mixtures thereof. In some embodiments, the polyolefin is a homopolymer such as polyethylene, polypropylene, polybutylene, polypentene-1, poly-3-methylbutene-1, poly-4-methylpentene-1, polyisoprene, polybutadiene, poly-1,5-hexadiene, polyhexene-1, polyoctene-1 and polydecene-1.

In one embodiment, the branched polymers can be a long chain branched ethylene copolymer comprising units derived from at least one polymerizable polyene. Polymerizable polyene is a polyene with at least two double bonds that can be incorporated into growing polyethylene chains during a polymerization reaction. In a preferred embodiment, the branched polymer is a copolymer of 1) ethylene; 2) up to 20 mol % (preferably from 0.1 mol % to 15 mol %, preferably from 1 mol % to 10 mol %) of one or more $C_4$ to $C_{40}$ (preferably $C_4$ to $C_{20}$, preferably $C_6$ to $C_{12}$) olefins, preferably alpha olefins (preferably 1-butene, 1-hexene, and 1-octene); and 3) one or more polymerizable polyenes (preferably present at 5 mol % or less, preferably 1 mol % or less, more preferably 0.5 mol % or less, alternately the polyene is present at 0.001 mol % to 5 mol %, alternately 0.01 mol % to 3 mol %, alternately 0.1 mol % to 1 mol %), preferably alpha-omega dienes, preferably one or more of 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, and 1,13-tetradecadiene, tetrahydroindene, norbornadiene also known as bicyclo-(2.2.1)-hepta-2,5-diene, dicyclopentadiene, 5-vinyl-2-norbornene, 1,4-cyclohexadiene, 1,5-cyclooctadiene, and 1,7-cyclododecadiene.

Long-chain branched copolymers can be obtained when a polymer chain (also referred as macromonomer) with reactive polymerizable groups is incorporated into another polymer chain during the polymerization of the latter. The resulting product comprises a backbone of the second polymer chain with branches of the first polymer chains (i.e., macromonomer) extending from the backbone. For polymerization with presence of polymerizable polyene (normally a diene), the polyene can be incorporated into a polymer chain through one polymerizable double bond in a similar manner as the incorporation of other comonomers such as 1-hexene and 1-octene. Polymer chains containing polymerizable polyene thus become reactive due to the residual second polymerizable double bond of polyene. These reactive polymer chains can then be incorporated into another growing polymer chain during polymerization through the second double bond of a polyene. This doubly inserted polyene creates a linkage between two polymer chains and leads to branched structures. The branching structure formed through diene linkage between polymer chains is referred to as "H" type and is preferably a tetra-functional branching structure. The number of branches and level of branches (branches on branches) depend on the amount of polyene incorporated.

In a polymerization system with a metallocene catalyst, a macromonomer with reactive double bonds can also be incorporated into another polymer chain to form a long chain branched polymer with tri-functional branching structures. These reactive double bonds can be vinyl groups on the chain ends of polymer chains produced in the polymerization system. The resulting product comprises a backbone of the second polymer chain with branches of the first polymer chains extending from the backbone. In one embodiment, the long chain branched modifier includes both tetra-functional and tri-functional branching structures.

A preferred class of polyolefins is branched ethylene polymers. An ethylene polymer is any polymer comprising greater than 50 mol % of ethylene-derived units. Useful examples of the branched polymers are partly or entirely homopolymerized or copolymerized in autoclave or tubular reactors at pressures above 100 MPa with the use of free-radical initiators. Such branched polymers and copolymers, include, but are not limited to, low density ethylene polymers such as high pressure low density ethylene homopolymer (LPDE), ethylene-vinyl acetate copolymer (EVA), ethylene-acrylic acid copolymer (EAA), such as ethylene methyl acrylate (EMA), ethylene-carboxylic acid copolymers and ethylene acrylate copolymers, as well as, olefin polymers produced at low to medium pressures such as polybutylene (PB). A preferred class of branched polymer is LDPE.

As discussed above, it's believed that addition of the branched polymer increases the melt strength of the composition and improves the processability of the composition. Any branched polymer with a branching index g' less than 0.95, preferably less than 0.85, more preferably less than 0.7 can be used.

Suitable Examples can be ExxonMobil™ density polyethylene resins and ethylene-vinyl acetates resins, and Optema™ ethylene methyl acrylate resins, commercially available from ExxonMobil Chemical Company, Houston, Tex., USA.

Blowing Agent

Suitable blowing agents can be inorganic or organic, physical or chemical blowing agents. Suitable inorganic blowing agents include carbon dioxide, nitrogen, argon, water, air, oxygen, sulfur hexafluoride (SF6) and helium. Suitable organic blowing agents include aliphatic hydrocarbons having 1-9 carbon atoms, aliphatic alcohols having 1-3 carbon atoms, ketones, and fully and partially halogenated aliphatic hydrocarbons having 1-4 carbon atoms. Chemical blowing agents can include those which liberate gases such as nitrogen, carbon dioxide, ammonium bicarbonate and sodium bicarbonate and cause the formation of the desired closed cell structure. Suitable chemical blowing agents include, but are not limited to, organic blowing agents, such as 4,4'-oxybis benzene sulfonyl hydrazide; azodicarbonamide; azobisformamide; azobisisobutyronitrile; diazoaminobenzene; N,N-dimethyl-N,N-dinitroso terephthalamide; N,N-dinitrosopentamethylene-tetramine; benzenesulfonylhydrazide; benzene-1,3-disulfonyl hydrazide; diphenylsulfon-3-3, disulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic blowing agents such as ammonium bicarbonate and sodium bicarbonate. Any of the foregoing blowing agents may be used singly or in combination with one or more other blowing agents.

In a preferred embodiment, the blowing agents can be those capable of releasing a gas, such as carbon dioxide or nitrogen. In one preferred embodiment, the blowing agent can be those formed from nanoparticles of carbonates and an acid. For example, the blowing agent can contain a mixture of nanoparticles of an alkaline earth metal carbonate and a reactive acid.

The alkaline earth metal carbonates include calcium carbonate, magnesium carbonate, barium carbonate and the like or mixtures thereof. The preferred carbonate is calcium carbonate due to its cost and availability. The alkaline earth metal carbonate is nanosized by conventional techniques to have an average nanoparticle size of less than or equal to 500 nm (0.5 microns) and greater than or equal to 1.0 nm (0.001 microns), preferably 100 nm (0.1 microns) or less, most preferably 80 nm (0.08 microns) or less.

The acids can be acids or salts thereof that are solid and inert at room temperature and have a melting temperature below the melt processing temperature of the material to be foamed. For example, citric acid (3-carboxy-3-hydroxy pentanedioic acid) has a melting point of 153° C. while polystyrene has a melting point of 240° C. When pre-blended with the carbonate, any acid or salts thereof: (a) is solid and inert or nonreactive with the carbonate at room temperature, (b) has a melting temperature below the melt processing temperature of the material to be foamed, and (c) is reactive when liquefied with an alkaline earth metal carbonate to release $CO_2$. Acids and their corresponding salts that are useful in the present disclosure include, but are not limited to: acetic acid, ascorbic acid, boric acid, butanoic acid, carbonic acid, citric acid, chromic acid, formic acid, heptanoic acid, hexanoic acid, hydrocyanic acid, hydrofluoric acid, lactic acid, nitrous acid, octanoic acid, oxalic acid, pentanoic acid, phosphoric acid, propanoic acid, sulfurous acid and uric acid. Weak acids, such as sodium citrate and citric acid, are preferred.

An example of such a blowing agent is as described in U.S. Patent Application Publication No. 2011/0263734, all contents of which are incorporated herein by reference.

The blowing agent can be added in an amount of from 0.1 wt % to 10 wt %, from 0.2 wt % to 8 wt %, from 0.3 wt % to 7 wt %, from 0.4 wt % to 6 wt %, or from 0.5 wt % to 5.0 wt % based upon the weight of the composition. The blowing agent is preferably compounded with the propylene-based elastomer and/or the branched polymer so that it can disperse evenly within the composition.

These agents allow reduction of density of the foamed layer and accordingly reduction of cost of raw materials. The agent preferably takes a solid form, so it is conveniently dry-blended with the other components.

Suitable examples of blowing agent include Ecocell® commercially available from Polyfil Corporation, Rockaway, N.J., USA.

Making of the Composition

The compositions and blends described herein may be formed using conventional equipment and methods, such as by dry blending the individual components and subsequently melt mixing in a mixer, or by mixing the components together directly in a mixer, such as, for example, a Banbury™ mixer, a Maddox™ mixer, a Haake™ mixer, a Brabender™ internal mixer, or a single or twin-screw extruder, which may include a compounding extruder. Additionally, additives and other polymers may be included in the blend in one or more components of the blend, and/or in a product formed from the blend, such as a film, as desired. Such other polymers can be those known in the art, for example, a metallocene polyethylene resin Enable™ commercially available from ExxonMobil Chemical Company, Tex., USA. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates and hydrogenated rosins; UV stabilizers; heat stabilizers; antiblocking agents; release agents; anti-static agents; pigments; colorants; dyes; waxes; silica; fillers; talc; and the like. Preferably these additives are present at from 0.1 ppm to 1000 ppm based upon the weight of the composition.

The mixing step may involve first dry blending using, for example, a tumble blender, where the propylene-based elastomer, the branched polymers and the blowing agent are brought into contact first, without intimate mixing, which may then be followed by melt blending in an extruder (single or twin screw). Another method of blending the components is to melt blend the polymer pellets with the blowing agent directly in an extruder or batch mixer. It may also involve a "master batch" approach, where the final blowing agent concentration is achieved by combining neat polymer with an appropriate amount of blowing agent that had been previously prepared at a higher concentration. The mixing step may take place as part of a processing method used to fabricate articles, such as in the extruder on a cast film line.

Making of Foamed Layer

The foamed layer can be made using any known methods and equipment from the compositions described herein, such as sheet extrusion. In a preferred embodiment, the foamed layer can be made by a method comprising the following steps of: (a) providing a propylene-based elastomer comprising propylene and from 3% to 35% by weight ethylene and/or $C_4$ to $C_{20}$ alpha-olefin derived units, the elastomer having a heat of fusion, as determined by DSC, of less than 75 J/g, a melting point, as determined by DSC, of less than 110° C., and a crystallinity of less than 40%; and a branched polymer having a branching index of less than 0.95; (b) forming a melt blend of the propylene-based elastomer, the branched polymer, and a blowing agent; and (c) extruding the melt blend to form the foamed layer. In some embodiments, the method also comprising a step of drawing down the extruded layer to a desired thickness.

The foamed layers may vary in thickness depending on the intended applications. Typically the extrusion can be made through a sheet die having a die gap of from 1 mil to 40 mils (25.4 μm to 1016 μm). A thickness of foamed layer varying from 1 μm to 500 μm is usually suitable.

In some embodiments, the foamed layer is a foamed film. The foamed film may be formed by any of the conventional techniques known in the art including extrusion, co-extrusion, extrusion coating, lamination, blowing and casting.

In a preferred embodiment, the films, including monolayer or multilayer films, containing the compositions described herein, may be formed by using casting techniques, such as a chill roll casting process. For example, a composition can be extruded in a molten state through a flat die and then cooled to form a film. As a specific example, cast films can be prepared using a cast film line machine as follows. Pellets of the polymer are melted at a temperature sufficient to melt the polymer components of the composition and sufficient for activation of the blowing agent. In the case of a multilayer cast film, the two or more different melts, are conveyed to a coextrusion adapter that combines the two or more melt flows into a multilayer, coextruded structure. This layered flow is distributed through a single manifold film extrusion die to the desired width. The die gap opening is typically 0.025 inches (about 600 μm). The material is then drawn down to the final gauge. A vacuum box, edge pinners, air knife, or a combination of the foregoing can be used to pin the melt exiting the die opening to a primary chill roll. The resulting polymer film is collected on a winder. The film thickness can be monitored by a gauge monitor, and the film can be edge trimmed by a trimmer. A typical cast line rate is from 250 to 2000 feet (76.2 to 609.6 m) per minute. One or more optional treaters can be used to surface treat the film, if desired. Such chill roll casting processes and apparatus are well known in the art, and are described, for example, in The Wiley-Encyclopedia of Packaging Technology, Second Edition, A. L. Brody and K. S. Marsh, Ed., John Wiley and Sons, Inc., New York (1997). Although chill roll casting is one example, other forms of casting may be employed.

In some preferred embodiments, the foamed layer prepared from the compositions described herein can have a density of less than 0.8 g/cm$^3$, preferably within any range from a low value of 0.30 g/cm$^3$, 0.35 g/cm$^3$, 0.40 g/cm$^3$, 0.45 g/cm$^3$, or 0.50 g/cm$^3$ to a high value of 0.80 g/cm$^3$, 0.75 g/cm$^3$, 0.70 g/cm$^3$, 0.65 g/cm$^3$, 0.60 g/cm$^3$, 0.55 g/cm$^3$, 0.50 g/cm$^3$, or 0.45 g/cm$^3$, so long as the high value is not less than the low value.

In some preferred embodiments, foamed layer prepared from the compositions described herein can have a density that is at least 10%, at least 15%, at least 18%, at least 20%, at least 22%, at least 25%, at least 27%, at least 30%, at least 35% or even at least 40% lower than that of a comparative layer sample.

In multilayer constructions containing the foamed layer and other layer(s), the other layer(s) may be any layer typically included in multilayer film structures. For example, the other layer(s) may be polyolefins, polar polymers, cationic polymers, and others like paper, wood, cardboard, metal, etc. In one preferred embodiment, other layer(s) can be prepared using the propylene-based elastomer as described herein. In some embodiments, the other layer can be a non-foamed layer made from the propylene-based elastomer, and the multilayer structure can have a different laminate structures, such as those comprising structures of AB, BA, ABA, ABB, BAB, BAA, AAB, ABBA, ABAB, AABAA, BBABB, ABBAB, ABABA and variants thereof, wherein "A" is a foamed layer of the present disclosure and B is layer that is different than A, and can be foamed or non-foamed layer.

Applications

The composition and foamed layer as described herein are useful in a wide variety of applications where a combination of light-weight, foamed aesthetics, stretchability, and elasticity is desired. Examples of those applications include personal hygiene applications, such as infant diaper and training pants; apparel such as clothing, undergarments, sports apparel and gloves; film applications, such as monolayered film or multi-layered film; roofing applications; flooring applications, such as expansion joints and flooring underlayment; packaging applications, such as packaging for bottles, shopping bags, courier envelopes for electronics and fragile, sleeves for insulation and/or grip surface; and tape applications such as adhesive tape for irregular surfaces and mounting materials.

Other embodiments of the invention are also described as follows:

Embodiment A

A composition comprising: a propylene-based elastomer comprising propylene and from 3 wt % to 35 wt % by weight ethylene and/or $C_4$ to $C_{20}$ alpha-olefin derived units based upon the weight of the propylene-based elastomer, the elastomer having a heat of fusion, as determined by DSC, of less than 75 J/g, and a melting point, as determined by DSC, of less than 110° C.; a branched polymer having a branching index of less than about 0.9; and a blowing agent.

Embodiment B

The composition of Embodiment A, wherein the propylene-based elastomer comprises from 5 wt % to 25 wt % ethylene-derived units based upon weight of the propylene-based elastomer.

Embodiment C

The composition of Embodiment A or B, wherein the propylene-based elastomer has a melt flow rate, as determined by ASTM D1238 at 2.16 kg, 230° C., of from 0.2 g/10 min to 50 g/10 min.

Embodiment D

The composition of any of Embodiments A to C, wherein the propylene-based elastomer has a density of from 0.855 g/cm$^3$ to 0.900 g/cm$^3$.

Embodiment E

The composition of any of Embodiments A to D, wherein the propylene-based elastomer has a melt strength of less than 5 cN.

Embodiment F

The composition of any of Embodiments A to E, wherein the propylene-based elastomer is present in an amount of from 30 wt % to 99.5 wt % based upon the weight of the composition.

Embodiment G

The composition of any of Embodiments A to F, wherein the branched polymer is an ethylene polymer.

Embodiment H

The composition of any of Embodiments A to G, wherein the branched polymer is at least one of polyethylene, ethylene vinyl acetate, and ethyl methyl acrylate.

Embodiment I

The composition of any of Embodiments A to H, wherein the branched polymer has a melt index as determined by ASTM 1238 (190° C., 2.16 kg), of from 0.2 g/10 min to 20 g/10 min.

Embodiment J

The composition of any of Embodiments A to I wherein the branched polymer has a branching index (g') of less than 0.7.

Embodiment K

The composition of any of Embodiments A to J, wherein the branched polymer has a melt strength at least 5% higher than that of the propylene-based elastomer.

Embodiment L

The composition of any of Embodiments A to K, wherein the branched polymer is present in an amount of from 0.2 wt % to 70 wt % based upon the weight of the composition.

Embodiment M

The composition of any of Embodiments A to L, wherein the blowing agent is capable of releasing gas.

Embodiment N

The composition of any of Embodiments A to M, wherein the blowing agent comprises nanoparticles of an alkaline earth metal carbonate and an acid, said acid being capable of reacting with said carbonate resulting in release of carbon dioxide.

Embodiment O

The composition of any of Embodiments A to N, wherein the blowing agent comprises $CaCO_3$.

Embodiment P

The composition of any of Embodiments A to O, wherein the blowing agent is present in an amount of from 0.1 wt % to 10 wt % based upon the weight of the composition.

Embodiment Q

A foamed layer made from the composition of any of Embodiments A to P.

Embodiment R

The foamed layer of Embodiment Q, wherein the foamed layer has a density of from 0.30 $g/cm^3$ to 0.80 $g/cm^3$.

Embodiment S

The foamed layer of Embodiment Q or R, wherein the foamed layer has a density at least 10% lower than that of a comparative layer sample.

Embodiment T

A foamed layer comprising: a propylene-based elastomer comprising from 3% to 35% by weight ethylene and/or $C_4$ to $C_{20}$ alpha-olefin derived units based upon the weight of the propylene-based elastomer, the polymer having a heat of fusion, as determined by DSC, of less than 75 J/g, and a melting point, as determined by DSC, of less than 110° C.; a branched polymer having a branching index of less than 0.95; wherein the foamed layer has a density of from 0.30 $g/cm^3$ to 0.80 $g/cm^3$.

Embodiment U

A method of making a foamed layer, comprising the steps of:

(a) providing a propylene-based elastomer comprising from 3% to 35% by weight ethylene and/or $C_4$ to $C_{20}$ alpha-olefin derived units based upon the weight of the propylene-based elastomer, the polymer having a heat of fusion, as determined by DSC, of less than 75 J/g, and a melting point, as determined by DSC, of less than 110° C.; and a branched polymer having a branching index of less than 0.95;

(b) forming a melt blend of the propylene-based elastomer, the branched polymer, and a blowing agent; and (c) extruding the melt blend to form the foamed layer.

Embodiment V

The method of Embodiment U, wherein in step (c) the melt blend is extruded through a sheet die having a die gap of from 1 to 40 mils.

Embodiment W

The method of Embodiment U or V, wherein the method further comprises the step of (d) drawing down the extruded layer obtained in step (c).

Embodiment X

An article made from the composition of any of Embodiments A to P, wherein the article is a film, personal hygiene material, packaging material, roofing material, tape material, or flooring material.

Embodiment Y

An article comprising the foamed layer of any of Embodiment Q or R, wherein the article is a film, personal hygiene material, packaging material, roofing material, tape material, or flooring material.

EXAMPLES

Test Method

Specific Gravity and film density was measured based on ASTM D792, using an Electronic Densimeter ED-120T. Specific gravity was then converted to film density by multiplying by a factor of 0.9975. Grams per Square Meter (GSM), gives an indication of the film density and was calculated as weight/specimen surface area.

Yield Average Gauge (YAG) gives an indication of specimen thickness of the foamed film samples. Foamed film specimens were cut as typically 1×4 inch in size in a machine direction and weighed with an analytical balance. YAG is then calculated according to the following formulas: YAG=[specimen weight/(film density×specimen surface area)].

Film density drop (DD %), reported as percentage, was estimated by the following Equation:

$$DD\% = [(D_c - D_s)/D_c] \times 100\%$$

wherein Ds represented the density of the foamed film, Dc represented the density of the comparative layer sample, which is a non-foamed layer made from a composition that is free of the branched polymer and the blowing agent but otherwise is identical in terms of the constitutes and had a density of 0.86 g/cm$^3$.

Hysteresis tests were run on foamed film samples in a tensile tester to an extension of 200% and returned to zero load. The test condition corresponding to the first cycle is designated "Cycle 1," and the second cycle is designated as "Cycle 2". Cycle 2 test conditions also correspond to 200% extension and returned to zero load. The following stretchability and elasticity properties as defined below can be reflected from the hysteresis curves (Strain/Stress curves).

Permanent Set (%): Strain level corresponding to zero force on return, upon stretching a foamed film to 200% extension. This was done in the transverse direction;

Load Loss (%): (Load on Ascending Curve-Load on Descending Curve)/Load on Ascending calculated at the 50% strain level;

Hysteresis: Area enclosed by the ascending and descending portion of the load displacement curve;

Mechanical Hysteresis: Area under the ascending portion of the load displacement curve; and Hysteresis (%): Hysteresis/Mechanical Hysteresis.

Cell structures were visually assessed based on the cells formed in the foaming process with classifications of "Good", "OK" and "Poor". "Good" was used to describe a foamed film with closed cells intact and with no or minimal cell ruptures; "OK" was used to describe a foamed film with mostly closed cells intact, but also with a few cell ruptures and perhaps a few holes; "Poor" was used to describe a foamed film with some closed cells, some ruptured cells, and some holes.

Exemplary foamed films were prepared on a Killion cast film line capable of mono-extrusion and co-extrusion in Examples 1 to 11. The Killion mini-cast line is equipped with 3-extruders and can produce 5 layer coex structures out of slit die. The 1 inch extruder was used to make the structures produced in monolayer. The structures produced in multilayer, used the 1 inch and one of the ¾ inch extruders. In each Example, components as shown in Table 1, were dry blended and then melted and homogenized with a single-screw extruder having L/D of 24 and a smooth bore barrel. Various extrusion temperature profiles were used as shown in Table 2. The melted blends were extruded through a die having a die gap of 12 mils (about 304 μm) and came in contact with a chill roll cooled with recirculating water. Foamed film samples were made at varying winder speeds.

Examples 1 to 3 were foamed films having laminate structure of AABAA, BBABB, and BBABB, respectively, made via co-extrusion, in which A was a foamed layer made from compositions as shown in Table 1 and B was made from 100 wt % VM6102FL propylene-based elastomer and was free of blowing agent and the branched polymer. Examples 4 to 10 were monolayer foamed films made from compositions as shown in Table 1.

TABLE 1

| | Components of Examples | | | | | |
|---|---|---|---|---|---|---|
| Example | VM6102FL (wt %) | Ecocell LA (wt %) | TC220 (wt %) | LD503.LP (wt %) | LD319.92 (wt %) | LD200.48 (wt %) |
| 1 (layer A) | 94 | 6 | | | | |
| 2 (layer A) | 94 | 6 | | | | |
| 3 (layer A) | 75.2 | 4.8 | 20 | | | |
| 4 | 94 | 6 | | | | |
| 5 | 75 | 5 | 20 | | | |
| 6 | 75 | 5 | | 20 | | |
| 7 | 75 | 5 | | | 20 | |
| 8 | 75 | 5 | | | | 20 |
| 9 | 90.2 | 5.8 | | | | 4 |
| 10 | 94 | 6 | | | | |

VM6102FL is a Vistamaxx™ propylene-based elastomer commercially available from ExxonMobil Chemical Company, Houston, Tex., USA. It comprises from 16% by weight ethylene-derived units and has a heat of fusion of about 5 J/g, a MFR of about 3 g/10 min, a mm triad tacticity of about 90% mm, and a density of about 0.862 g/cm$^3$.

Ecocell-LA is a mixture of Ecocell® additives containing CaCO$_3$ and an acid being capable of reacting with CaCO$_3$ resulting in release of carbon dioxide available from Polyfil Corporation, Rockaway, N.J., USA and a polymer carrier, which was believed to have a branching index of less than 0.95.

LD200.48 is a low density polyethylene resin commercially available from ExxonMobil Chemical Company, Houston, Tex., USA. It has a branching index g' of about 0.21 and a density of 0.915 g/cm$^3$, and a melt index (190° C., 2.16 kg) of 7.5 g/10 min.

LD319.92 is an ethylene-vinyl acetate resin commercially available from ExxonMobil Chemical Company, Houston, Tex., USA. It has a density of 0.930 g/cm$^3$, and a melt index (190° C., 2.16 kg) of 2.0 g/10 min.

LD503.LP is a low density polyethylene resin commercially available from ExxonMobil Chemical Company, Houston, Tex., USA. It has a branching index g' of about 0.37 and a density of 0.919 g/cm$^3$, and a melt index (190° C., 2.16 kg) of 2.3 g/10 min.

TC220 is an Optema™ ethylene methyl acrylate copolymer with about 24 wt % of comonomer commercially available from ExxonMobil Chemical Company, Houston, Tex., USA. It has a branching index g' of about 0.55 and a density of 0.945 g/cm$^3$, and a melt index (190° C., 2.16 kg) of 5.0 g/10 min.

TABLE 2

Processing Conditions of Chill Roll Process

| Example | Feed Zone (° C.) | Transition Zone (° C.) | Metering Zone (° C.) | Adapter (° C.) | Adapter2 | Die Temp (° F.) | Feedblock | Melt Temp (° C.) | Melt Pressure (psi) | Screw Speed (rpm) | Die Gap (μm) | Winder Speed (fpm) | Chill Roll Temp (° C.) |
|---|---|---|---|---|---|---|---|---|---|---|---|---|---|
| 1 (layer A) | 164 | 184 | 218 | 177 | 186 | 177 | 177 | | | 121 | 304 | 15 | 17 |
| 2 (layer A) | 166 | 204 | 199 | 177 | 182 | 177 | 177 | 198 | 1830 | 79 | 304 | 13 | 18 |
| 3 (layer A) | 167 | 204 | 199 | 177 | 177 | 177 | 177 | 191 | 1840 | 80 | 304 | 17 | 18 |
| 4 | 158 | 177 | 186 | 186 | 172 | 153 | 150 | 182 | 2260 | 121 | 304 | 3 | 17 |
| 5 | 154 | 172 | 181 | 149 | 157 | 149 | 149 | 183 | 2825 | 121 | 304 | 9 | 18 |
| 6 | 176 | 182 | 212 | 202 | 199 | 174 | 177 | 214 | 2140 | 120 | 304 | 15 | 28 |
| 7 | 182 | 184 | 219 | 177 | 177 | 177 | 177 | 216 | 1925 | 121 | 304 | 7 | 18 |
| 8 | 173 | 184 | 219 | 172 | 172 | 168 | 171 | 217 | 1980 | 121 | 304 | 6 | 27 |
| 9 | 161 | 183 | 218 | 193 | 193 | 191 | 193 | 221 | 1775 | 120 | 304 | 5 | |
| 10 | 193 | 199 | 194 | 166 | 166 | 166 | | 192 | 1775 | 90 | 304 | 3 | 36 |

TABLE 3

Properties of film samples

| Example | GSM | YAG (mils) | Specific Gravity (g/cm³) | Film Density (g/cm³) | Estimate of Film Density drop | Cell Structure |
|---|---|---|---|---|---|---|
| 1 (layer A) | 82 | 7.1 | 0.46 | 0.45 | 47% | Ok |
| 2 (layer A) | 79 | 5.8 | 0.54 | 0.54 | 37% | OK |
| 3 (layer A) | 70 | 6.6 | 0.42 | 0.42 | 51% | OK |
| 4 | 229 | 19.7 | 0.46 | 0.46 | 47% | Good |
| 5 | 85 | 4.3 | 0.77 | 0.77 | 11% | Good |
| 6 | 53 | 6.1 | 0.34 | 0.34 | 61% | Good |
| 7 | 106 | 6.7 | 0.62 | 0.62 | 28% | Good |
| 8 | 119 | 7.2 | 0.65 | 0.65 | 25% | Good |
| 9 | 143 | 12.8 | 0.44 | 0.44 | 49% | Ok/Poor |
| 10 | 136 | 8.9 | 0.60 | 0.60 | 30% | Ok |

It can be seen from the results that in all Examples the resulted foamed layer had a at least 10% reduced density compared with a comparative layer sample made from a composition that is free of the branched polymer but otherwise identical in terms of constituents. Particularly, Examples 3, 6, and 9 achieved weight reduction of about 50% or greater.

Figure 1:
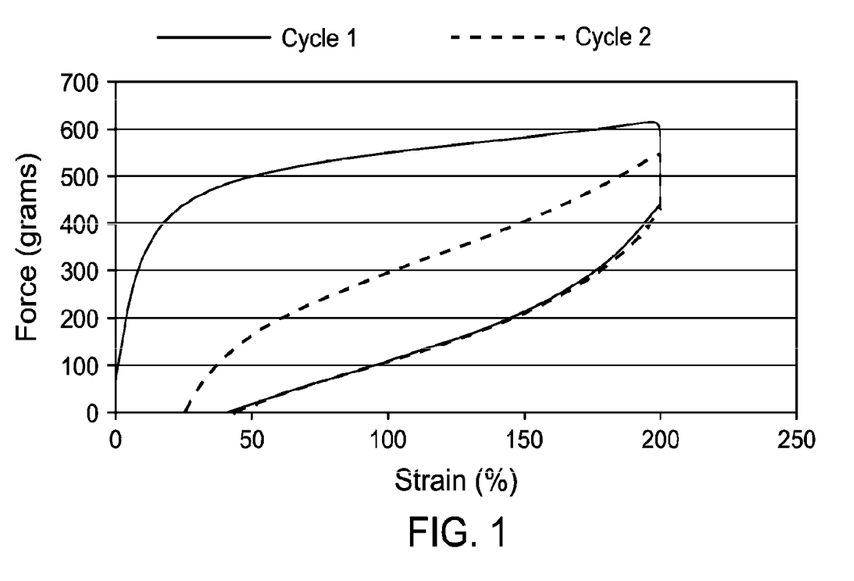
FIGS. 1 to 5 depict the hysteresis curves in Cycle 1 and Cycle 2 for the exemplary foamed film of the claimed invention.
Figure 2:
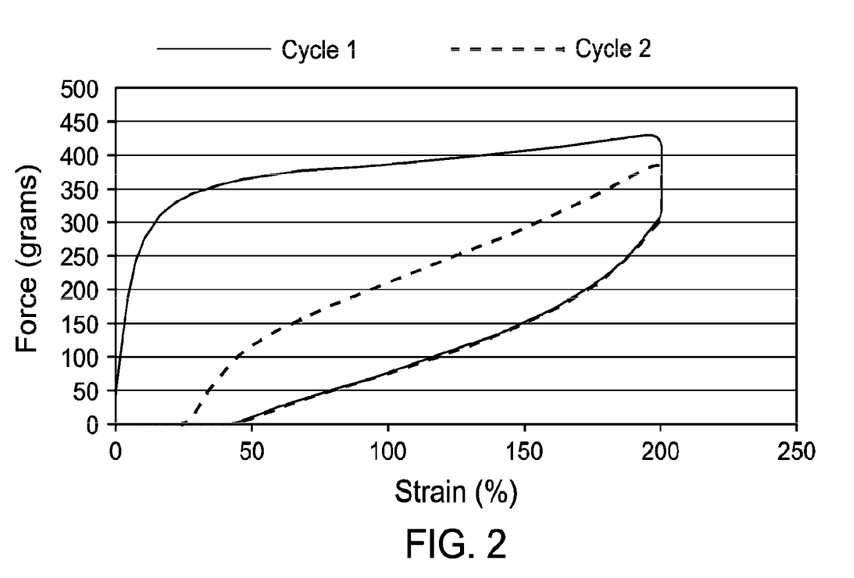
Figure 3:
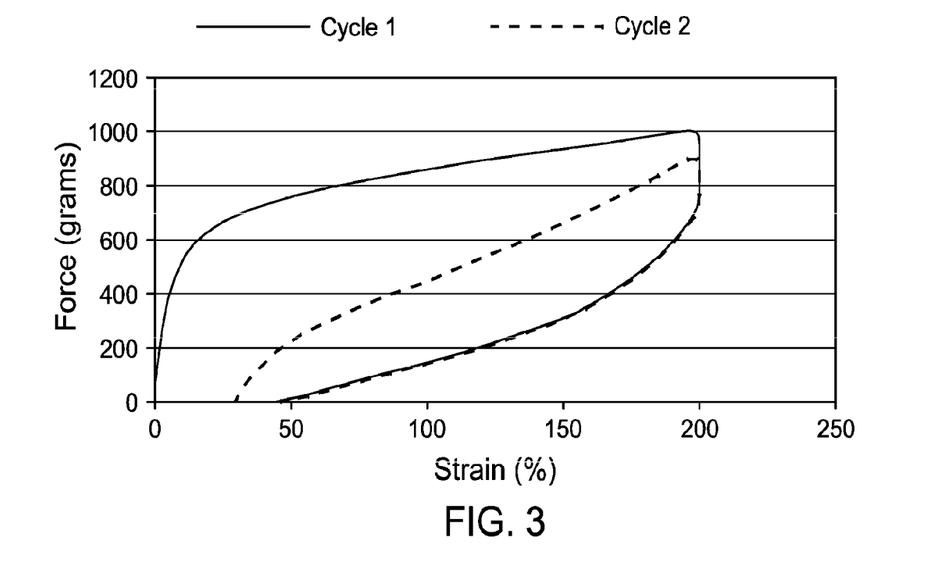
Figure 4:
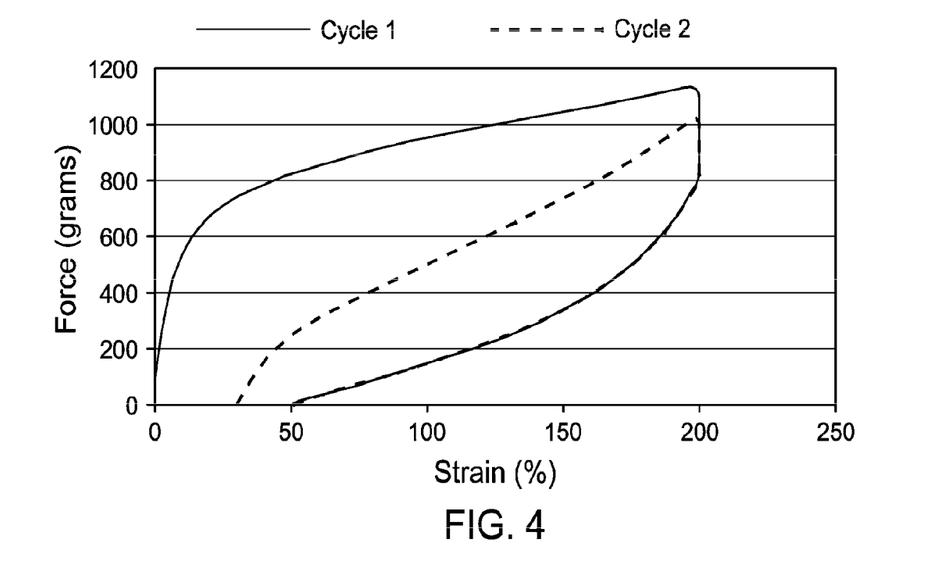
Figure 5:
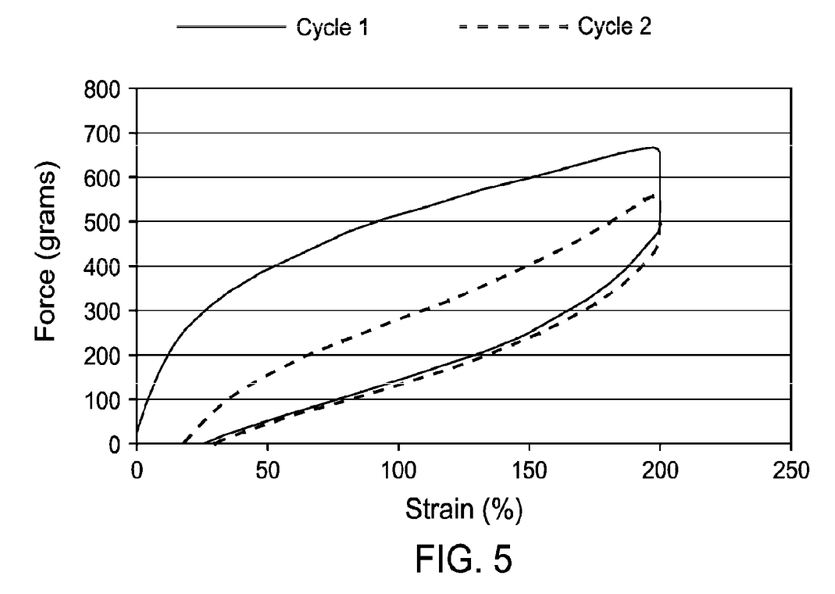

FIGS. 1 to 5 show the hysteresis curves of the foamed film of Examples 5, 6, 7, 8, and 10. It can be seen from the hysteresis curves that hysteresis and load upon stretching of the foamed film is lower in the second cycle.

All documents described herein are incorporated by reference herein. When numerical lower limits and numerical upper limits are listed herein, ranges from any lower limit to any upper limit are contemplated. As is apparent from the foregoing general description and the specific embodiments, while forms of the invention have been illustrated and described, various modifications can be made without departing from the spirit and scope of the invention. Accordingly, it is not intended that the invention be limited thereby.

We claim:

1. A composition comprising:
   a propylene-based elastomer comprising propylene and from 3 wt % to 35 wt % by weight ethylene and/or $C_4$ to $C_{20}$ alpha-olefin derived units based upon the weight of the propylene-based elastomer, the elastomer having a heat of fusion, as determined by DSC, of less than or equal to 75 J/g, and a melting point, as determined by DSC, of less than or equal to 110° C.;
   a branched polymer having a branching index of less than 0.95; and
   a blowing agent.

2. The composition of claim 1, wherein the propylene-based elastomer comprises from 5 wt % to 25 wt % ethylene-derived units based upon weight of the propylene-based elastomer.

3. The composition of claim 1, wherein the propylene-based elastomer has a melt flow rate, as determined by ASTM D1238 at 2.16 kg, 230° C., of from 0.2 g/10 min to 50 g/10 min.

4. The composition of claim 1, wherein the propylene-based elastomer has a density of from 0.855 g/cm³ to 0.900 g/cm³.

5. The composition of claim 1, wherein the propylene-based elastomer has a melt strength of less than 5 cN.

6. The composition of claim 1, wherein the propylene-based elastomer is present in an amount of from 30 wt % to 99.5 wt % based upon the weight of the composition.

7. The composition of claim 1, wherein the branched polymer is an ethylene polymer.

8. The composition of claim 7, wherein the ethylene polymer is at least one of polyethylene, ethylene vinyl acetate, and ethyl methyl acrylate.

9. The composition of claim 1, wherein the branched polymer has a melt index as determined by ASTM 1238 (190° C., 2.16 kg), of from 0.2 g/10 min to 20 g/10 min.

10. The composition of claim 1, wherein the branched polymer has a branching index (g') of less than 0.7.

11. The composition of claim 1, wherein the branched polymer has a melt strength at least 5% higher than that of the propylene-based elastomer.

12. The composition of claim 1, wherein the branched polymer is present in an amount of from 0.2 wt % to 70 wt % based upon the weight of the composition.

13. The composition of claim 1, wherein the blowing agent is capable of releasing gas.

14. The composition of claim 1, wherein the blowing agent comprises nanoparticles of an alkaline earth metal carbonate and an acid, said acid being capable of reacting with said carbonate resulting in release of carbon dioxide.

15. The composition of claim 14, wherein the alkaline earth metal carbonate is $CaCO_3$.

16. The composition of claim 1, wherein the blowing agent is present in an amount of from 0.1 wt % to 10 wt % based upon the weight of the composition.

17. A foamed layer made from the composition of claim 1.

18. The foamed layer of claim 17, wherein the foamed layer has a density of from 0.30 g/cm³ to 0.80 g/cm³.

19. A foamed layer comprising:
    a propylene-based elastomer comprising propylene and from 3% to 35% by weight ethylene and/or $C_4$ to $C_{20}$ alpha-olefin derived units based upon the weight of the propylene-based elastomer, the elastomer having a heat of fusion, as determined by DSC, of less than or equal to 75 J/g, and a melting point, as determined by DSC, of less than or equal to 110° C.;

a branched polymer having a branching index of less than 0.95;

wherein the foamed layer has a density of from 0.30 g/cm$^3$ to 0.80 g/cm$^3$.

20. A method of making a foamed layer, comprising the steps of:
(a) providing
a propylene-based elastomer comprising propylene and from 3% to 35% by weight ethylene and/or $C_4$ to $C_{20}$ alpha-olefin derived units based upon the weight of the propylene-based elastomer, the elastomer having a heat of fusion, as determined by DSC, of less than or equal to 75 J/g, and a melting point, as determined by DSC, of less than or equal to 110° C.; and
a branched polymer having a branching index of less than 0.95;
(b) forming a melt blend of the propylene-based elastomer, the branched polymer, and a blowing agent; and
(c) extruding the melt blend to form the foamed layer.

21. The method of claim 20, wherein in step (c) the melt blend is extruded through a sheet die having a die gap of from 1 mil to 40 mil.

22. The method of claim 20, wherein the method further comprises the step of (d) drawing down the extruded layer obtained in step (c).

23. An article made from the composition of claim 1, wherein the article is a film, personal hygiene material, packaging material, roofing material, tape material, or flooring material.

24. An article comprising the foamed layer of claim 17, wherein the article is a film, personal hygiene material, packaging material, roofing material, tape material, or flooring material.

* * * * *